United States Patent
Wilson et al.

(10) Patent No.: US 9,807,459 B2
(45) Date of Patent: Oct. 31, 2017

(54) MEDIA INTERFACE DEVICE

(71) Applicant: AT&T INTELLECTUAL PROPERTY I, L.P., Atlanta, GA (US)

(72) Inventors: Brian Wilson, Johnston, IA (US); Douglas Alman, San Marcos, CA (US); Todd Andrew Fryer, Liberty, MO (US); Nicholas Nicas, Blue Springs, MO (US); Charles D. Turner, Jr., San Diego, CA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 50 days.

(21) Appl. No.: 14/712,716

(22) Filed: May 14, 2015

(65) Prior Publication Data
US 2016/0337700 A1    Nov. 17, 2016

(51) Int. Cl.
*H04N 7/16* (2011.01)
*H04N 21/462* (2011.01)
*H04N 21/433* (2011.01)
*H04N 21/438* (2011.01)
*H04N 21/61* (2011.01)
*H04N 21/643* (2011.01)
*H04N 21/6405* (2011.01)
(Continued)

(52) U.S. Cl.
CPC ..... *H04N 21/4622* (2013.01); *H04N 21/4334* (2013.01); *H04N 21/4358* (2013.01); *H04N 21/4383* (2013.01); *H04N 21/43615* (2013.01); *H04N 21/6118* (2013.01); *H04N 21/6125* (2013.01); *H04N 21/6143* (2013.01); *H04N 21/6405* (2013.01); *H04N 21/64322* (2013.01)

(58) Field of Classification Search
CPC .................................................. H04N 21/4108
See application file for complete search history.

(56) References Cited

U.S. PATENT DOCUMENTS 6,493,875 B1    12/2002    Eames et al.
6,968,376 B2    11/2005    Horie et al.
6,978,474 B1    12/2005    Sheppard et al.
(Continued)

FOREIGN PATENT DOCUMENTS

EP    1117214 A2    7/2001
EP    2609748 A2    7/2013

OTHER PUBLICATIONS

Wowza Streaming Engine, Wowza media systems, wowza.com, http://www.wowza.com/products/streaming-engine, 2015, 3 pages.
(Continued)

*Primary Examiner* — Junior Mendoza
(74) *Attorney, Agent, or Firm* — Toler Law Group, PC

(57) ABSTRACT

A method includes receiving, at a media interface device, a media selection command included in a first communication from an application executing on a processor in a display device. The method further includes transmitting a signal to a particular module of a plurality of modules of the media interface device, where the particular module is selected based on the media selection command, and where each of the plurality of modules is configured to receive media content from a corresponding media source. The method further includes sending a second communication to the application. The second communication includes a particular media content item received via the particular module.

19 Claims, 7 Drawing Sheets

(51) Int. Cl.
  *H04N 21/435* (2011.01)
  *H04N 21/436* (2011.01)

(56) References Cited

U.S. PATENT DOCUMENTS

| | | | |
|---|---|---|---|
| 7,458,092 B1 | 11/2008 | Parker et al. | |
| 7,899,042 B2 | 3/2011 | Chapel et al. | |
| 8,549,567 B2 | 10/2013 | Russ et al. | |
| 8,671,425 B2 | 3/2014 | Hicks, III et al. | |
| 8,681,775 B2 | 3/2014 | Multach et al. | |
| 8,713,617 B2 | 4/2014 | Phillips et al. | |
| 8,724,639 B2 | 5/2014 | Mahmoud | |
| 8,743,790 B2 | 6/2014 | Taylor et al. | |
| 8,832,750 B2 | 9/2014 | Chen et al. | |
| 8,886,710 B2 | 11/2014 | Evans et al. | |
| 8,904,029 B2 | 12/2014 | White et al. | |
| 8,930,277 B2 | 1/2015 | Lewis et al. | |
| 8,949,919 B2 | 2/2015 | Cholas et al. | |
| 8,966,550 B2 | 2/2015 | Davies et al. | |
| 2004/0172652 A1 | 9/2004 | Fisk et al. | |
| 2005/0076373 A1* | 4/2005 | Jung | H04L 12/2801 725/80 |
| 2006/0136968 A1 | 6/2006 | Han et al. | |
| 2007/0110035 A1* | 5/2007 | Bennett | H04L 12/2898 370/352 |
| 2007/0226365 A1 | 9/2007 | Hildreth et al. | |
| 2008/0022322 A1* | 1/2008 | Grannan | H04N 5/44591 725/78 |
| 2008/0098450 A1 | 4/2008 | Wu et al. | |
| 2008/0120667 A1* | 5/2008 | Zaltsman | H04L 12/2856 725/110 |
| 2009/0044242 A1* | 2/2009 | Ramakrishnan | H04N 7/162 725/118 |
| 2009/0080870 A1 | 3/2009 | Mudie et al. | |
| 2009/0172749 A1 | 7/2009 | Martch | |
| 2010/0115575 A1 | 5/2010 | Yu et al. | |
| 2010/0169753 A1 | 7/2010 | Chen et al. | |
| 2011/0239258 A1* | 9/2011 | Fisk | H04L 29/06027 725/81 |
| 2011/0265129 A1* | 10/2011 | Na | H04L 12/2836 725/80 |
| 2012/0030706 A1 | 2/2012 | Hulse et al. | |
| 2012/0084463 A1 | 4/2012 | Holden et al. | |
| 2012/0320761 A1 | 12/2012 | Taylor et al. | |
| 2015/0023648 A1 | 1/2015 | Sheth et al. | |
| 2015/0082359 A1* | 3/2015 | Kuba | H04N 21/4788 725/74 |

OTHER PUBLICATIONS

Brookes, T., "UPnP/DLNA," Make Use of, makeuseof.com, Sep. 13, 2012, http://www.makeuseof.com/tag/6-upnpdlna-servers-streaming-media-devices-crossplatform/, 8 pages.

Hanselman, S., "Plex" Blog, hanselman.com, Jan. 30, 2013, http://www.hanselman.com/blog/PlexIsTheMediaCenterSoftwareEcosstemIveBeenWaitingFor.aspx, 8 pages.

Simmermon, J., "Now Launching TWC TV for Samsung Smart TVs", Jul. 30, 2013, twcableuntangled.com/2013/07/now-launching-twc-tv-for-Samsung-smart-tvs/, 1 page.

* cited by examiner

MEDIA INTERFACE DEVICE

FIELD OF THE DISCLOSURE

The present disclosure is generally related to media interface devices.

BACKGROUND

Multimedia devices, such as "smart" televisions, tablet computers, mobile phones, set top boxes, etc. may receive multimedia content that originates from a variety of providers. The variety of providers may transmit content using a variety of transmission technologies (e.g., 8 vestigial sideband modulation, satellite digital video broadcasting, internet protocol television, cable television, cellular communication, online streaming, etc.). Certain multimedia devices may be incompatible with certain transmission technologies. Therefore, intermediate devices, such as set top boxes, may receive content and convert the content to a format that a multimedia device is configured to receive. However, providing an intermediate device for each multimedia device and/or for each transmission technology may be costly. For example, if a user has three televisions in his or her home, then to view both satellite and cable television programs at each of the televisions, the user may need to acquire six set top boxes (e.g., a separate cable and satellite set top box for each of the three televisions). Further, recorded cable and satellite content may be stored separately (e.g., in one or more digital video recorders (DVRs)), so it may be cumbersome for the user to switch between different recorded programs. In addition, intermediate devices (e.g., set top boxes) may use different user interface control schemes, which may lead to the user having to keep track of multiple remote control devices.

DETAILED DESCRIPTION

Figure 1:
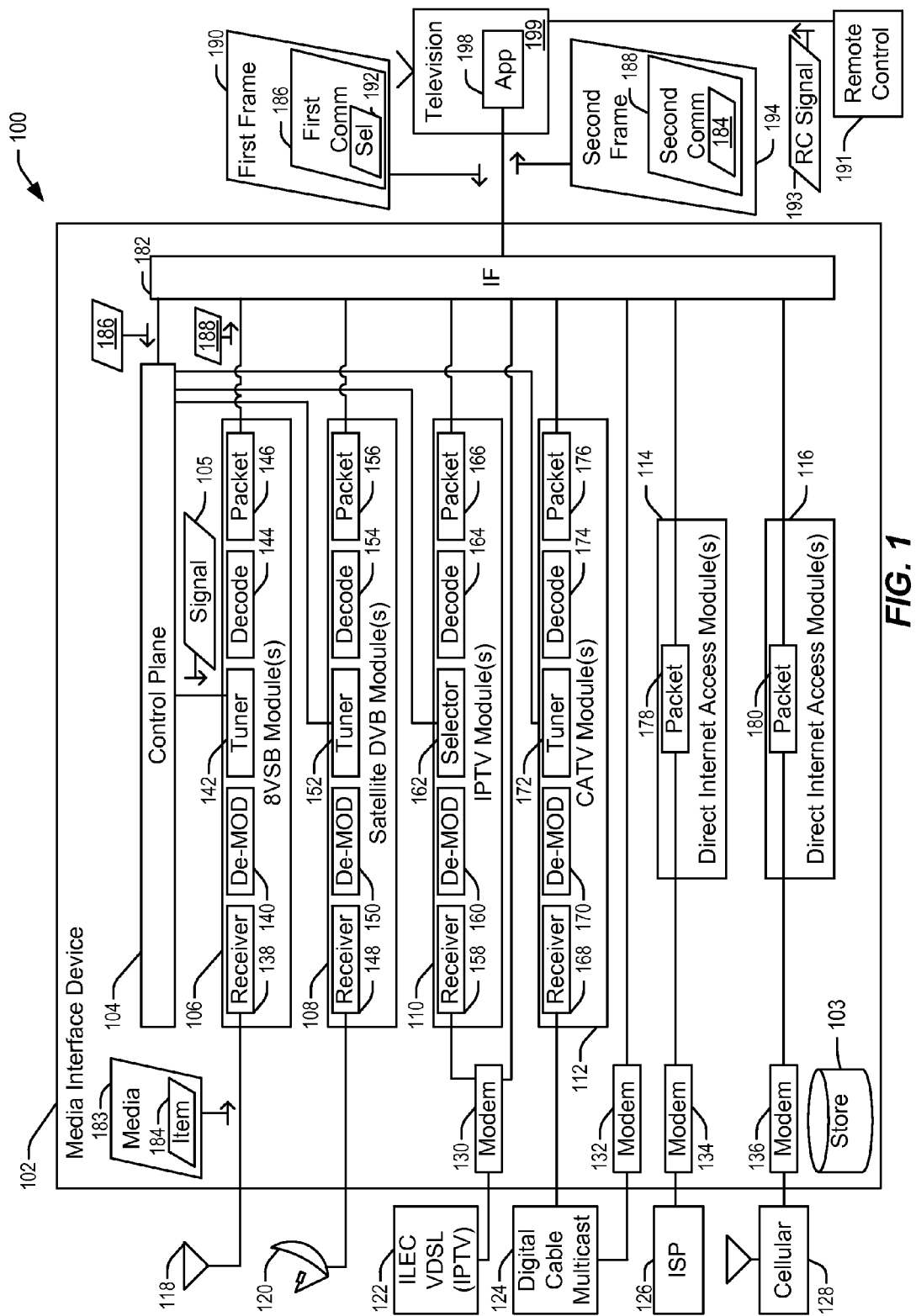
FIG. 1, is a block diagram illustrating a particular embodiment of media interface device.

The present disclosure describes a media interface device and methods of using the media interface device. A media interface device may include a plurality of modules configured to receive media content from corresponding media sources. Each media source may be associated with a corresponding communication technology (e.g., 8 vestigial sideband modulation, satellite digital video broadcasting, internet protocol television, cable television, cellular communication, online streaming, etc.). Each module may be configured to convert data received from the corresponding media source into a common format (e.g., an internet protocol format). The media interface device may communicate with an application executed by a processor of a display device (e.g., a television, a mobile phone, a laptop computer, a tablet computer, or another device capable of displaying media content). In particular examples, the media interface device may communicate with more than one application. For example, more than one application may be executing at a processor, or the media interface device may communicate with applications executed by processors at different display devices.

The media interface device may receive a media selection command from an application. The media selection command may specify a module and a particular media content item (e.g., a television program) or channel (e.g., a television channel). In response to the media selection command, the media interface device may send the particular media content item to the application using the common format (e.g., the internet protocol format). In particular examples, the media selection command may be generated by the application based on input received from a remote control device associated with the display device. The media interface device may also include one or more components (e.g., modules) that are configured to convert received media content into the common format (e.g., into IP packets).

Thus, the media interface device may be controlled by one or more applications executing at one or more display devices (e.g., televisions). Since a user may interact with the application using a remote control associated with the display device, the media interface device may enable the user to select content from multiple sources using a single remote control device (associated with the display device) rather than separate remote control devices for each content source. For example, because applications executing at televisions may directly interact with the media interface device, set top boxes may not be needed to request and view media content. Additionally, since the media interface device may receive commands from and provide content to more than one display device, a separate intermediate device (e.g., a set top box) for each display device is not needed to receive content from a variety of providers that use a variety of technologies to transmit content. Thus, in accordance with the disclosed systems and methods, a user may use his or her television remote control to view, record, and switch between programming from various content sources, such as cable, satellite, internet protocol television, online streaming, etc.

In a particular illustrative embodiment, a method includes receiving, at a media interface device, a media selection command included in a first communication from an application executing on a processor in a display device. The media selection command identifies a particular media content item. The method further includes receiving the particular media content item via a particular module of a plurality of modules of the media interface device. The particular module is selected based on the media selection command. Each of the plurality of modules is configured to receive media content from a corresponding media source. The method further includes sending a second communication to the application. The second communication includes at least a portion of the particular media content item received via the particular module.

In another illustrative embodiment, an apparatus includes a plurality of modules. Each module of the plurality of modules is configured to receive media content from a corresponding media source. The apparatus further includes an interface configured to receive a media selection command included in a first communication from an application executing on a processor in a display device. The media selection command identifies a particular media content item. The interface is also configured to send a second communication to the application, where the second communication includes at least a portion of the particular media content item. The apparatus further includes a control plane configured to select a particular module of the plurality of modules to receive the particular media content item based on the media selection command.

In another illustrative embodiment, a computer readable storage device stores instructions executable by a processor to perform operations including receiving, at a media interface device, a media selection command included in a first communication from an application executing on a processor in a display device. The media selection command identifies a particular media content item. The operations further include receiving the particular media content item via a particular module of a plurality of modules of the media interface device. The particular module is selected based on the media selection command, and each of the plurality of modules is configured to receive media content from a corresponding media source. The operations further include sending a second communication to the application. The second communication includes at least a portion of the particular media content item received via the particular module.

FIG. 1 is a block diagram 100 illustrating a particular illustrative embodiment of a media interface device 102. The media interface device 102 may function as a "universal gateway" that enables access to live and/or recorded media content available from various types of content sources. The media interface device 102 includes a control plane 104 in communication with a plurality of modules 106, 108, 110, 112. The control plane 104 may be configured to send control signals to the plurality of modules 106, 108, 110, 112. In the illustrated example, the control plane 104 communicates with an 8-level vestigial sideband modulation (8VSB) module 106, a satellite digital video broadcasting (DVB) module 108, an internet protocol television (IPTV) module 110, and a cable television (CATV) module 112. In some examples, the control plane 104 may be in communication with more modules or fewer modules. For example, the control plane 104 may be in communication with multiple modules of the same type (e.g., two different satellite DVB modules 108 corresponding to two different satellite television providers, content sources, or satellite transmission technologies).

The media interface device 102 may further include additional modules 114, 116 not controlled by the control plane 104. In the illustrated example, the media interface device 102 includes a first direct internet access module 114 and a second direct internet access module 116. The media interface device 102 may include more or fewer direct internet access modules in alternative embodiments.

The media interface device 102 may further include an interface 182. While a single interface 182 is shown, the interface 182 may represent a plurality of interfaces to support communication in accordance with a plurality of communications standards. For example, the interface 182 may include an Ethernet interface, a home phone networking alliance interface (e.g., for communication of IP packets via a coaxial cable connection), a power-line (e.g., Ethernet over power-line) interface, an Institute of Electrical and Electronics Engineers (IEEE) 802.11 interface, any other link layer interface, or a combination thereof. The interface 182 may enable communication between components of the media interface device 102 (e.g., the control plane 104 and/or the modules 106, 108, 110, 112, 114, 116) and display devices. Thus, the media interface device 102 may support multiple types of network technologies to communicate with applications executing at display devices (e.g., televisions). For example, a television 199 located near the media interface device 102 may communicate via a wired Ethernet connection with the media interface device 102, whereas a television located in a separate room of a house from the media interface device 102 may utilize a wireless IEEE 802.11 connection or a power-line connection to communicate with the media interface device 102. It should be noted that although one or more embodiments described herein reference communication between the media interface device 102 and television(s), such embodiments are not to be considered limiting. The systems and methods of the present disclosure are also compatible with applications executing on display devices other than televisions, such as mobile phones, laptop computers, tablet computers, or other devices capable of displaying media content, as illustrative non-limiting examples.

Each of the modules 106, 108, 110, 112, 114, 116 of the media interface device 102 may be configured to receive media content from a corresponding media source. For example, in the illustrated example, the 8VSB module 106 includes a receiver 138 configured to receive media content (e.g., broadcast television) from an antenna 118. The antenna 118 may receive the media content over-the-air from a terrestrial broadcaster (e.g., a television station). The 8VSB module 106 further includes a demodulator 140 configured to demodulate the media content received at the receiver 138. The 8VSB module 106 further includes a tuner 142 configured to tune to particular media content received by the receiver 138. For example, the receiver 138 may receive a plurality of television channels and the tuner 142 may be configured to select a particular channel (e.g., a particular frequency or frequency range) of the plurality of television channels. The tuner 142 may be responsive to control signals from the control plane 104. The 8VSB module 106 further includes a decoder 144. The decoder 144 may be configured to decode the particular media content (e.g., programs of the selected television channel). In a particular embodiment, decoders within the media interface device 102, such as the decoder 144, are configured to decrypt media content that is received in an encrypted format.

For example, decoders within the media interface device 102 may store and manage decryption key(s) provided by content providers. The 8VSB module 106 further includes a packetizer 146. The packetizer 146 is configured to packetize the decoded particular media content. For example, the packetizer 146 may insert audio and/or video data from received media content into one or more internet protocol (IP) packets. The packetizer 146 may send the packetized audio and/or video data to the interface 182 for transmission (e.g., to the television 199). To illustrate, the media interface device 102 and the television 199 may be coupled via an IP network (e.g., the television 199 may have an Ethernet port that is connected to an Ethernet port of the media interface device 102 or the television may have an IEEE 802.11 wireless network adapter configured to communicate wirelessly with the media interface device 102), and the packetizer 146 may encapsulate media (e.g., audio, video, and or text) content in IP packets for communication between the media interface device 102 and the television 199. The television 199 may receive the IP packets and may output the media content based on data included in the IP packets.

For example, video content may be output at a display screen and audio content may be output at one or more speakers.

The satellite DVB module 108 may include a receiver 148 configured to receive media content (e.g., satellite television) from a satellite antenna 120. The satellite antenna 120 may receive the media content over-the-air from a satellite broadcaster. The satellite DVB module 108 may further include a demodulator 150 configured to demodulate the media content received at the receiver 148, a tuner 152 responsive to the control plane 104 and configured to tune to (e.g., select) particular media content received by the receiver 148, a decoder 154 configured to decode the particular media content (e.g., programs of a selected television channel), and a packetizer 156 configured to packetize decoded media content (e.g., into IP packets).

The IPTV module 110 may include a receiver 158 configured to receive media content (e.g., IPTV content) from a modem 130. The modem 130 may receive the media content via an incumbent local exchange carrier (ILEC) very-high bit-rate digital subscriber line (VDSL) connection 122 to an IPTV provider. In alternative embodiments, a different type of connection may be used to communicate with the IPTV provider. The modem 130 may also communicate directly with other devices (e.g., the television 199) via the interface 182. The IPTV module 110 may further include a demodulator 160 configured to demodulate the media content received at the receiver 158 and an IPTV content selector 162 configured to generate requests for content to be transmitted via the modem 130 to the IPTV provider. It should be noted that the IPTV content selector 162 may operate differently from cable or satellite tuners. For example, instead of tuning to a particular channel or frequency range, the IPTV content selector 162 may request that particular media content (e.g., a particular television channel or program) be provided by the IPTV provider to the receiver 158. In an illustrative example, the IPTV content selector 162 generates internet group management protocol (IGMP) requests, such as join requests or leave requests for unicast or multicast communication, as illustrative non-limiting examples. The IPTV module 110 further includes a decoder 164 configured to decode media content (e.g., programs of a selected television channel) and a packetizer 166 configured to packetize decoded media content. For example, because an IGMP join request for a multicast group is transmitted by the media interface device 102, the IPTV packets received via the multicast group may identify the media interface device 102 as the destination of the IPTV packets. To provide received IPTV content to the television 199 (and optionally to additional televisions, as described with reference to FIGS. 2-3), the decoder 164 may extract audio/video data from the received IPTV packets and the packetizer 166 may packetize the extracted audio/video content into IP packets that are sent to an IP address of the television 199. Alternatively, the decoder 164 may be bypassed and the packetizer 166 may forward the received IPTV packets to the television 199, such as by modifying a destination address field of the received IPTV packets.

The CATV module 112 may include a receiver 168 configured to receive media content (e.g., cable television content) from a digital cable multicast connection 124. The digital cable multicast connection 124 may receive the media content from a cable television provider. The CATV module 112 further includes a demodulator 170 configured to demodulate the media content received at the receiver 168, a tuner 172 responsive to the control plane 104 and configured to tune to particular media content received by the receiver 168, a decoder 174 configured to decode media content (e.g., programs of a selected television channel), and a packetizer 176 configured to packetize decoded media content. In the illustrated example, the digital cable multicast connection is further coupled to a modem 132. The modem 132 may transmit content and messages directly to and from the interface 182 (e.g., to support communication between the television 199 and a cable television network).

Whereas the 8VSB module 106, the satellite DVB module 108, the IPTV module 110, and the CATV module 112 enable receiving and converting media content into a common format (e.g., IP packets) supported by the television 199, the media interface device 102 may also support bypassing certain format conversion operations in certain scenarios. For example, the media interface device 102 includes direct access modules 114, 116 that process media content received from certain types of content sources without performing demodulation or decoding. To illustrate, the first direct internet access module 114 may include a packetizer 178. The packetizer 178 may receive packets (e.g., IP packets) from a modem 134 in communication with an internet service provider (ISP) 126. The packetizer 178 may extract the contents of packets (e.g., packets addressed to a public IP address of the media gateway device 102) received from the modem 134 and insert the contents into new packets (e.g., packets addressed to a private IP address of a device in communication with the interface 182). The new packets may be sent to other devices (e.g., the television 199).

Similarly, the packetizer 178 may receive packets (e.g., packets addressed to a private IP address of the media interface device 102) from the interface 182. The packetizer 178 may extract the contents of packets (e.g., packets addressed to a private IP address of the media gateway device 102) received from the interface 182 and insert the contents into new packets (e.g., packets addressed to a public IP address of a device in communication with the ISP 126). The new packets may be sent to the modem 134 to be sent to the ISP 126. In an alternative embodiment, the packetizer 178 may change packet headers to redirect packets instead of generating new packets. For example, the packetizer 178 may change a destination address field of a packet to the IP address of the television 199, thereby causing the interface 182 to forward the packet to the television 199.

The second direct internet access module 116 may include a packetizer 180. The packetizer 180 may receive packets (e.g., IP packets) from the modem 136. The modem 136 may be in communication with a cellular service provider 128 that supports communication of IP packets. For example, the cellular service provider 128 may be associated with a third generation (3G) network, a fourth generation (4G) network, a long term evolution (LTE) network, a LTE advanced (LTE-A) network, or another type of network that supports communication of IP packets, as illustrative non-limiting examples. The packetizer 180 may extract the contents of packets (e.g., packets addressed to a public IP address of the media gateway device 102) received from the modem 136 and insert the contents into new packets (e.g., packets addressed to a private IP address of a device in communication with the interface 182). The new packets may be sent to the interface 182 to be sent to other devices (e.g., the television 199). The packetizer 180 may also process upstream communication packets sent by the television 199 to the media interface device 102 and may forward content included in such packets to the cellular service provider 128 via the modem 136.

The media interface device 102 further includes a storage device 103. The storage device 103 may be a hard drive, a solid state drive, another kind of storage device, or a combination thereof. The storage device 103 may be configured to store media content items received by the modules 106, 108, 110, 112. For example, the storage device 103 may provide storage and retrieval of media content items to enable digital video recorder (DVR) functionality at a single device (e.g., the media interface device 102) for media content received from multiple types of content sources (e.g., 8VSB, satellite, cable, IPTV, etc.). In an alternative embodiment, a DVR storage device may be external to the media interface device 102 (e.g., offsite storage or included in a separate device that is accessible to the media interface device 102).

In operation, each of the modules 106, 108, 110, 112, 114, 116 may provide content received from a corresponding content provider to an application executing at a device in communication with the interface 182. Further, operation of the modules 106, 108, 110, 112 may be controlled by the control plane 104 based on messages received from the application. In the illustrated example, a processor of the television 199 executes an application 198. In alternative embodiments, as further described with reference to FIGS. 2-3, the media interface device 102 may communicate with multiple applications executing at a display device and/or applications executing at different display devices. The application 198 may send messages to and receive messages from the interface 182 of the media interface device 102. The application 198 may be responsive to a remote control signal 193 received from a remote control device 191. For example, the remote control signal 193 may be a channel change signal or a media selection signal. Based on the remote control signal 193, the application 198 may generate a media selection command 192. The media selection command 192 may identify one of the modules 106, 108, 110, 112 and identify particular media content (e.g., a television channel or program). To illustrate, the application 198 may be specific to retrieval of 8VSB content, and may therefore communicate with the 8VSB module 106 but not with other modules of the media interface device 102. Alternatively, a single application may be used to receive content from more than one type of module. In this example, the application 198 may determine which module type to indicate in the media selection command 192 based on input (e.g., from the remote control device 191), such as when a user of the remote control device 191 selects a particular content provider or content type. Examples of such use cases of the media interface device 102 are further described herein.

Thus, as further described herein, the application 198 may generate the media selection command 192 based on user input received via the remote control device 191, based on a timer/scheduler of the television 199, or based on one or more other inputs. The media selection command 192 may be included in a first communication 186 (e.g., a first IP packet), which may be transmitted to the media interface device 102 via a first frame (e.g., data packet) 190. Examples of frames that may be communicated between the media interface device 102 and the television 199 include, but are not limited to, an Ethernet frame, a home phone networking alliance frame, a power-line frame (e.g., Ethernet over power-line frame), an Institute of Electrical and Electronics Engineers (IEEE) 802.11 frame, or another link layer frame.

The interface 182 may extract the first communication 186 from the first frame 190 (e.g., via a de-encapsulation process) and relay the first communication 186 to the control plane 104. The control plane 104 may extract the media selection command 192 from the first communication 186. The control plane 104 may determine a type of module identified by the media selection command 192, what particular media content item is requested, and what type of action is requested. If a module type is not identified by the media selection command 192, the control plane 104 may determine the module type based on the media content item that is requested (e.g., if the media content item is an over-the-air television channel, the control plane 104 may determine that the 8VSB module 106 is to be used or based on the application). Information regarding the module type, the requested media content item, etc. may be included in one or more fields of the media selection command 192. In the illustrated example, the media selection command 192 identifies the 8VSB module type and a particular media content item 184 and requests that the particular media content item 184 be sent to the application 198. In other examples, the media selection command 192 may request that the particular media content item 184 be stored at the storage device 103 (e.g., a network DVR storage device) in addition to or in the alternative to being sent to the application 198.

The control plane 104 may determine whether a module of the module type identified by the media selection command 192 is available to send the particular media content item 184 to the application 198. For example, each of the modules 106, 108, 110, 112 may support outputting a limited number (e.g., one) of media content items at a time (e.g., one at a time). Modules that are outputting the limited number of media content items to other applications may not be available. Modules that are outputting less than the limited number of media content items or that are outputting media content to only the application 198 (and not to any other applications) may be available. Modules may output a media content item to more than one application, as described below with reference to FIG. 3.

When no module is available to output the particular media content item to the application 198, the control plane 104 may send a message to the application 198 via the interface 182 indicating that service is unavailable. When a module is available to output the particular media content item, the control plane 104 may send a signal to the available module based on the media selection command 192. The selected module 106, 108, 110, or 112 may provide the particular media content identified by the media selection command 192 to the interface 182 in response to the signal. The particular media content may be provided in a "common" communication format (e.g., IP packets) that the media interface device 102 and the application 198 are both compatible with.

In the illustrated example, the control plane 104 determines that the 8VSB module 106 is available to output the particular media content item 184 to the application 198. The receiver 138 of the 8VSB module 106 receives media content 183 including the particular media content item 184 from the antenna 118. The control plane 104 sends a signal 105 to the tuner 142 of the 8VSB module 106 in response to the media selection command 192. Based on the signal 105, the tuner 142 selects the particular media content item 184 from the received media content 183. The 8VSB module 106 sends a second communication 188 including the particular media content item 184 (or at least a portion thereof) to the interface 182 to be delivered to the application 198. For example, when the particular media content item 184 corresponds to a television channel, the second communication 188 may include at least one video frame for the television channel, video data for the television channel corresponding to at least particular duration of time (e.g., one second), etc. In a particular example, the signal 105 may identify an IP address of the television 199 (or the application 198).

The interface 182 may transmit the second communication 188 to the application 198 via a second frame 194 (e.g., an Ethernet frame, a home phone networking alliance frame, a power-line frame (e.g., Ethernet over power-line frame), an Institute of Electrical and Electronics Engineers (IEEE) 802.11 frame, or another link layer frame). The application 198 may cause the particular media content item 184 to be displayed at a display screen of the television 199. For example, in response to receiving the second frame 194, the application 198 may extract media content from the second frame 194 and output the media content at the television 199.

In one example of operation, a user of the television 199 may desire to view content from an 8VSB source. An illustrative example of 8VSB content includes over-the-air digital high-definition content that is broadcast in accordance with advanced television system committee (ATSC) standards. The user may use the remote control device 191 to launch the application 198 and select (e.g., via the remote control signal 193 and responsive to an electronic program guide (EPG) or other graphical user interface (GUI) displayed on the television 199) a particular 8VSB channel (e.g., a channel that is broadcasting the particular media content item 184). In response to the user's selection, the application 198 may generate the media selection command 192, where the media selection command 192 identifies the 8VSB module 106 and the selected channel. The 8VSB module 106 may acquire the requested media content item 184 and provide the requested media content item 184 to the television 199, as further described herein. The user may use the remote control device 191 to launch and interact with other applications to view satellite television content, IPTV content, cable television content, etc. via the corresponding module(s) of the media interface device 102. Further, the user may press button(s) of the remote control device 191 to launch and interact with a DVR application that is operable to request and receive media content stored in the storage device 103 of the media interface device 102 or in a separate network DVR device. The user may also press button(s) of the remote control device 191 to switch between watching live and recorded content. To illustrate, while watching a live IPTV program being received by the IPTV module 110 of the media interface device 102, the user may use the remote control device 191 to switch to watching previously recorded satellite TV content retrieved from the storage device 103 (or from a separate network DVR device).

Thus, FIG. 1 illustrates a single media interface device 102 that enables applications executing at display devices to access media content received from various types of content sources, without requiring that the display devices be connected to individual set top boxes or other intermediate devices for each of the content sources. For example, the application 198 may control the operation of the media interface device 102 based on user input received from a remote control device 191 associated with the television 199. Further, the media interface device 102 may be configured to store media content items received from various types of content sources. To illustrate, the media interface device 102 may function as a network DVR. Thus, the media interface device 102 may enable users to switch between different types of live and/or recorded/DVR content (e.g., cable, satellite, IPTV, etc.).

Figure 2:
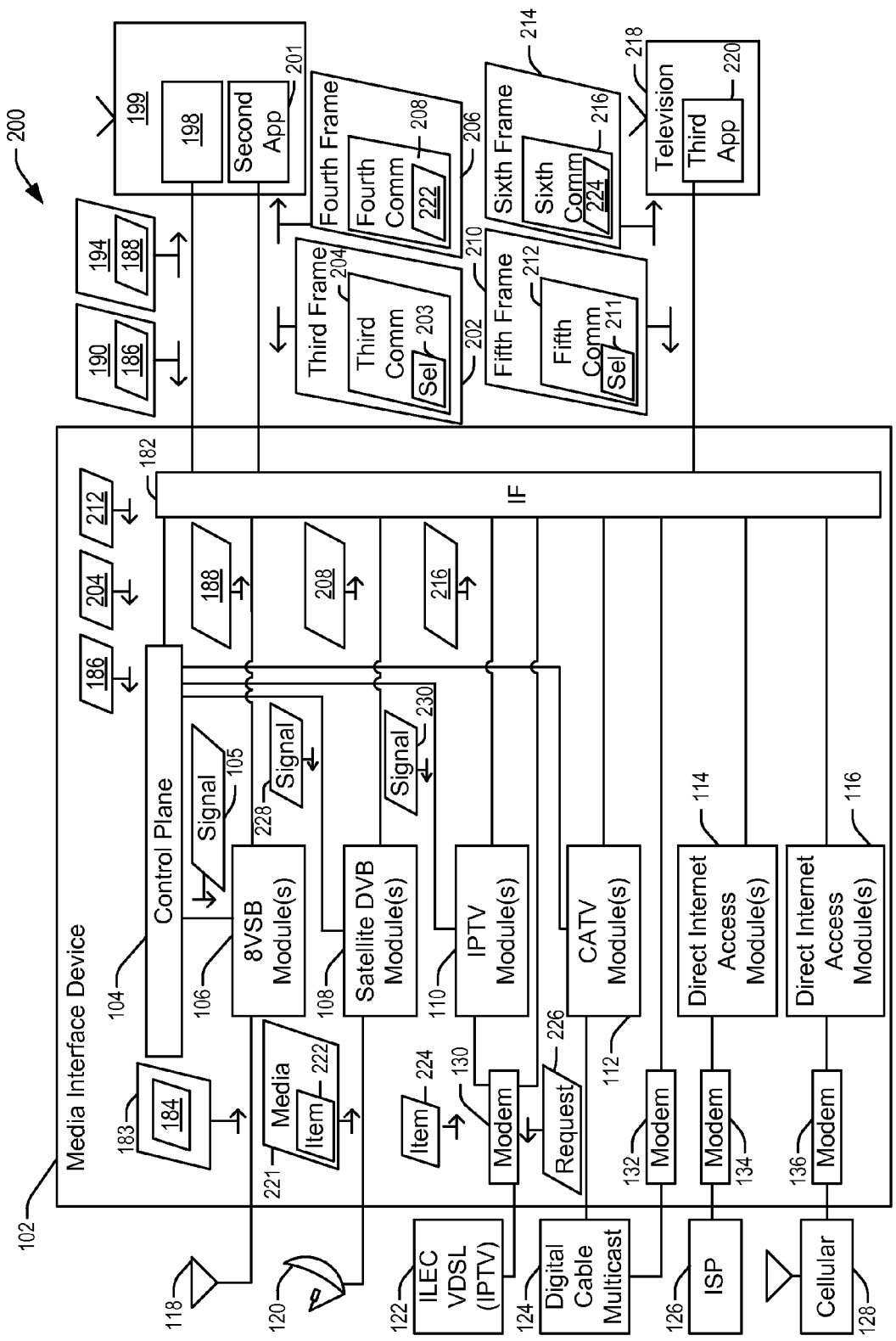
FIG. 2 is a block diagram illustrating another particular embodiment of using a media interface device.

Although FIG. 1 illustrates an embodiment in which the media interface device 102 is responsive to an application at a single television, in alternative embodiments, multiple applications executing at multiple televisions may be use the media interface device 102 in shared fashion. For example, FIG. 2 illustrates a block diagram 200 of a particular embodiment of sharing the media interface device 102 between multiple applications 198, 201, 220 executing at multiple televisions 199, 218.

The application 198 may send the first frame 190 to the media interface device 102 and may receive the second frame 194 from the media interface device 102, as described above with reference to FIG. 1. In FIG. 2, a second application 201 is also executed by processor(s) at the television 199. The application 198 and the second application 201 may be associated different ones of the modules 106, 108, 110, 112. For example, the first application 198 may be used to view 8VSB content and the second application 201 may be used to view DVB content. Alternatively, the second application 201 may be capable of receiving media content from more than one type of module and may receive input (e.g., remote control input) indicating a selected type of module.

In the illustrated example, the second application 201 sends a third communication 204 that includes a second media selection command 203 to the interface 182. The second media selection command 203 may be based on input from a remote control device (e.g., the remote control device 191 of FIG. 1) and may identify a type of module (e.g., a satellite DVB type) and particular media content 222 (e.g., a particular television channel). The third communication 204 is included in a third frame 202. The interface 182 extracts the third communication 204 from the third frame 202 and sends the third communication 204 to the control plane 104. The control plane 104 may determine whether a module that matches the type identified by the second media selection command 203 is available to send the particular media content 222 identified by the second media selection command 203 to the second application 201.

In the illustrated example, the control plane 104 determines that the satellite DVB module 108 is available to output the particular media content item 222 to the second application 201. Accordingly, the control plane 104 may send a signal 228 to the satellite DVB module 108 identifying the particular content item 222. The signal 228 may further identify the television 199 and the second application 201 (e.g., by IP address and port number).

Based on the signal 228, the tuner 152 may tune to the particular media content item 222 of media content 221 received by the receiver 148. The packetizer 156 may incorporate the particular media content item 222 into a fourth communication 208 (e.g., an IP packet) addressed to the second application 201 at the television 199 (e.g., by IP address and port number). The packetizer 156 may send the fourth communication 208 to the interface 182. The interface 182 may incorporate the fourth communication 208 into a fourth frame 206 addressed to the television 199 (e.g., to a media access control (MAC) address of an interface of the television 199). The television 199 may extract the fourth communication 208 from the fourth frame 206 and deliver the particular media content item 222 to the second application 201. The second application 201 may cause the television 199 to display video described by the particular media content item 222.

In the example of FIG. 2, a third application 220 is executed by a processor at a second television 218. For example, the third application 220 may enable viewing of IPTV content. Alternatively, the third application 220 may be capable of receiving media content from more than one type of module and may receive input (e.g., remote control input) indicating a selected type of module.

In the illustrated example, the third application 220 sends a fifth communication 212 that includes a third media selection command 211 to the interface 182. The third media selection command 211 may be based on input from a remote control device and may identify a type of module (e.g., an IPTV type) and a particular media content item 224 (e.g., a particular television channel or television program). The fifth communication 212 is included in a fifth frame 210. The interface 182 extracts the fifth communication 212 from the fifth frame 210 and sends the fifth communication 212 to the control plane 104. The control plane 104 may determine whether a module that matches the type identified by the third media selection command 211 is available to send the particular media content 224 identified by the second media selection command 211 to the third application 220.

In the illustrated example, the control plane 104 determines that the IPTV module 110 is available to output the particular media content item 224 to the third application 220. Accordingly, the control plane 104 may send a signal 230 to the IPTV module 110 identifying the particular content item 224. The signal 230 may further identify the second television 218 and the third application 220 (e.g., by IP address and port number).

Based on the signal 230, the content selector 162 may send a request 226 via the modem 130 and the ILEC VDSL connection to the IPTV provider. The request 226 may include a request for the particular media content 224. In response to the request 226, the IPTV provider may send the particular content item 224 to the IPTV module 110 via the ILEC VDSL connection 122 and the modem 130. The particular content item 224 may be received by the receiver 158. The packetizer 166 may incorporate the particular media content item 224 into a sixth communication 216 (e.g., an IP packet) addressed to the third application 220 at the second television 218 (e.g., by IP address and port number). The packetizer 166 may send the sixth communication 216 to the interface 182. The interface 182 may incorporate the sixth communication 216 into a sixth frame 214 addressed to the second television 218 (e.g., to a media access control (MAC) address of an interface of the second television 218). The second television 218 may extract the sixth communication 216 from the sixth frame 214 and deliver the particular media content item 224 to the third application 220. The third application 220 may cause the second television 218 to display video described by the particular media content item 224.

It should be noted, one or more of the operations described herein with reference to the applications 198, 201, 220 may occur at least partially concurrently. As an example, the applications 198, 201 may concurrently execute at the television 199 and enable a user to concurrently view 8VSB content and satellite content (e.g., in a picture-in-picture (PiP) mode of the television). As another example, while one or more of the applications 198, 201 is executing at the first television 199, the application 220 may be executed at the second television 218 to enable a second user to view IPTV content. Thus, in accordance with the present disclosure, the media interface device 102 may serve different types of media content to different applications executing on different televisions at the same time. The same type of live or recorded content may be provided to multiple televisions (e.g., if enough corresponding modules are available at the media interface device 102, if the television are viewing the same content, if the storage device 103 supports simultaneous access to different programs, etc.).

Thus, the diagram 200 illustrates how the media interface device 102 may provide media content items to a plurality of display devices (e.g., televisions) responsive to media selection commands received from the display devices. Accordingly, the diagram 200 illustrates how a single media interface device may be used to provide media content received using a plurality of communication techniques or technologies to a plurality of display devices. Therefore, the media interface device 102 may enable a plurality of display devices to receive media content without the need for a separate intermediate device (e.g., a set top box) for each display device.

Figure 3:
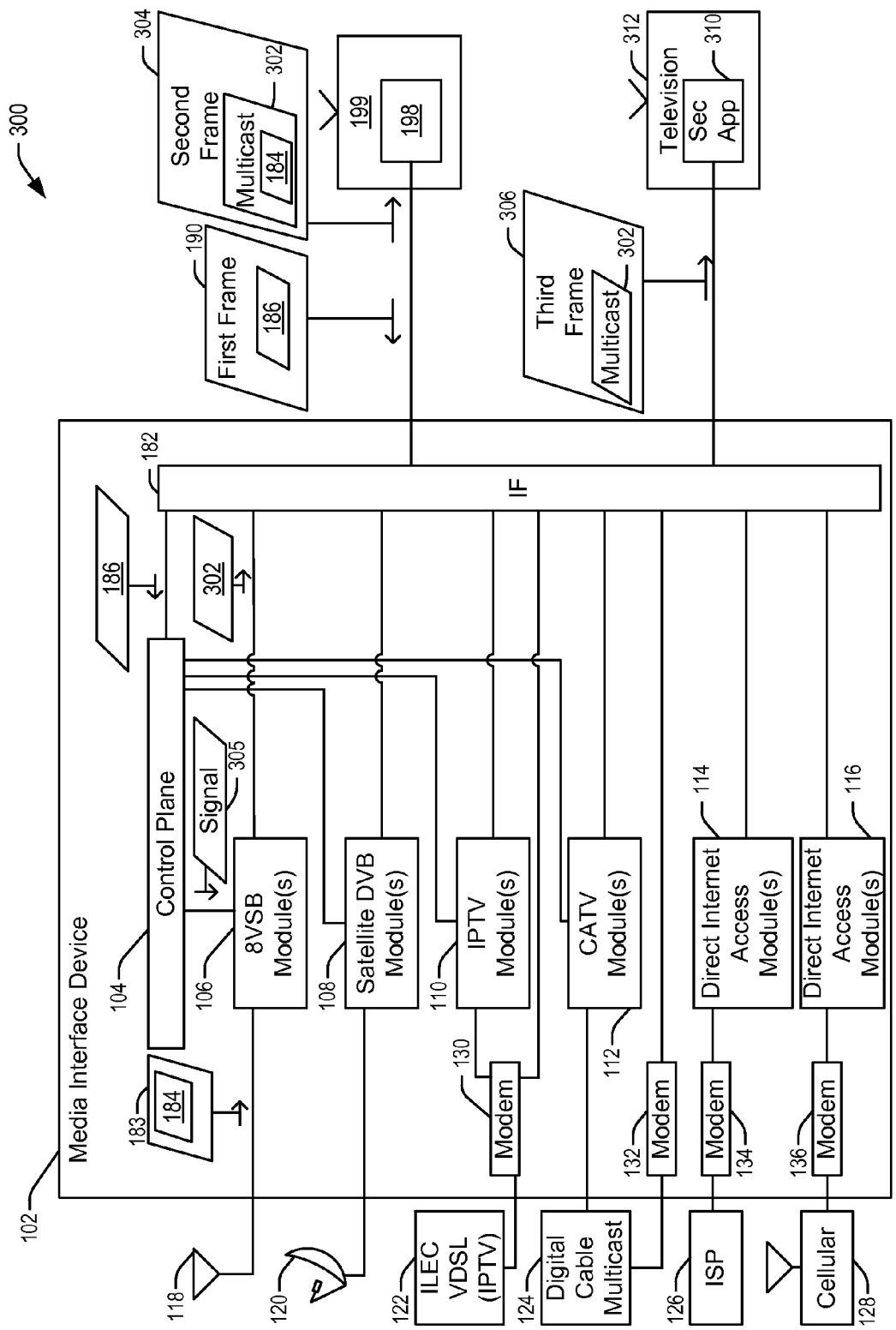
FIG. 3 is a block diagram illustrating another particular embodiment of using a media interface device.

FIG. 3 illustrates a block diagram 300 of an embodiment of using the media interface device 102 in which a module of the media interface device 102 can be shared between multiple display devices. For example, if users at multiple televisions are watching the same content, then a single module can be shared by the televisions and can send the content to each of the televisions.

In the illustrated example, the application 198 sends the media selection command 192 to the interface 182, as described above with reference to FIG. 1. The media selection command 192 may identify the 8VSB module type and the particular media content item 184 (e.g., a particular television channel). The control plane 104 may receive the media selection command 192 and determine whether any 8VSB modules are available to send the particular media content item 184 to the application 198. In the example of FIG. 3, the control plane 104 determines that the 8VSB module 106 is already sending the particular media content item 184 (e.g., the particular television channel) to a second application 310 executing at a processor of a second television 312 (e.g., a user at the second television 312 is already watching the television channel requested by the user at the first television 199).

In response, the control plane 104 may send a signal 305 to the 8VSB module 106. The signal 305 may indicate that the particular media content item 184 should be sent to the application 198 (in addition to being sent to the application 310 at the second television 312). For example, the signal 305 may correspond to a multicast join message. In response to the signal 305, the packetizer 146 of the 8VSB module 106 may address communications including the particular media content item 184 to both the application 198 at the television 199 and to the second application 310 at the second television 312. For example, the packetizer 146 may send a multicast (e.g., IP multicast) communication 302 that includes the particular media content item 184 to the interface 182. The interface 182 may receive the multicast communication 302 and generate frames for each destination of the multicast communication 302. In the illustrated example, the interface 182 generates a second frame 304 that includes the multicast communication 302 and a third frame 306 that includes multicast communication 302. The second frame 304 may have a destination address corresponding to an address (e.g., a MAC address) of an interface of the television 199 and the third frame 306 may have a destination address corresponding to an address (e.g., a MAC address) of the second television 312.

Thus, a single module of the media interface device 102 may be shared between multiple display devices in certain situations (e.g., when users at different display devices are watching the same television channel). By enabling sharing of modules when possible, the media interface device 102 may keep more modules free to serve subsequent requests for different television channels.

Figure 4:
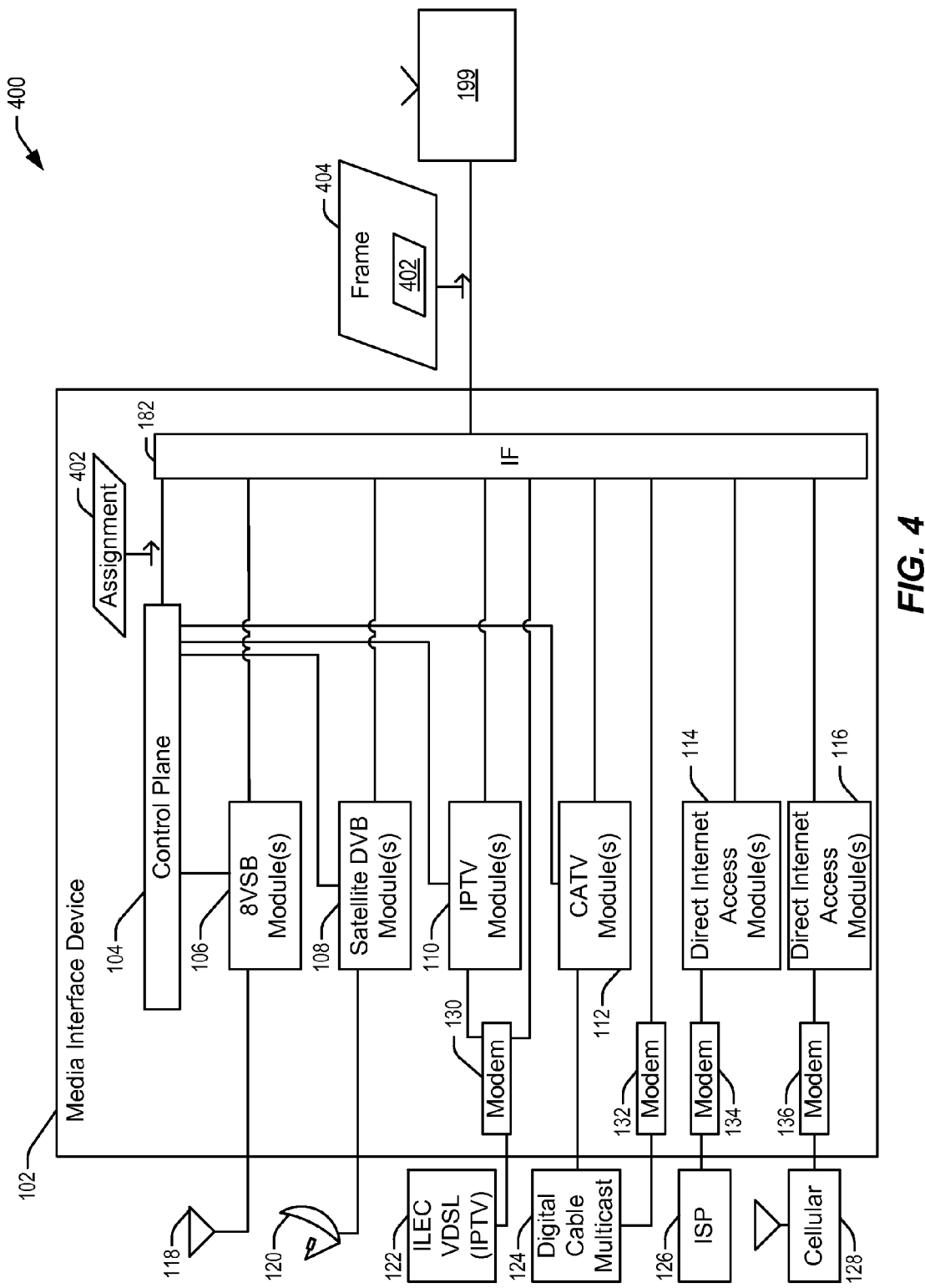
FIG. 4 is a block diagram illustrating another particular embodiment of using a media interface device.

As described with reference to FIGS. 1-3, the media interface device 102 may provide media content to display devices using IP packets that are addressed to the display devices. In an IP system, each of the display devices may have an assigned IP address that can be used to address packets. In particular implementations, the media interface device 102 may be a network gateway or router that is configured to manage IP address assignment to display devices. For example, FIG. 4 illustrates a block diagram 400 of an embodiment in which the media interface device 102 assigns IP addresses. In the illustrated example, the control plane 104 may generate an assignment message 402. The control plane 104 may send the assignment message 402 to the interface 182 to be sent to the television 199 as part of a frame 404. The assignment message 402 may correspond to a dynamic host configuration protocol (DHCP) message and may assign an IP address to the television 199. In particular examples, the assignment message 402 may be sent to the television 199 in response to one or more messages received from the television 199 (e.g., a DHCP discovery message and/or a DHCP request message).

Although not shown in FIG. 4, when the media interface device 102 functions as a network gateway or router and assigns IP addresses, the media interface device 102 may include additional network management modules and/or store additional network management data. As illustrative non-limiting examples, the media interface device 102 may include a web server that serves web pages corresponding to a configuration interface. To illustrate, a user may access the configuration interface to change network management settings. As another example, the media interface device 102 may include radio frequency (RF) circuitry to support an IEEE 802.11 wireless network. As another example, the media interface device 102 may include modules configured to implement network security and/or encryption. As another example, the media interface device 102 may store a DHCP routing table, a table of authorized MAC addresses, etc.

Figure 5:
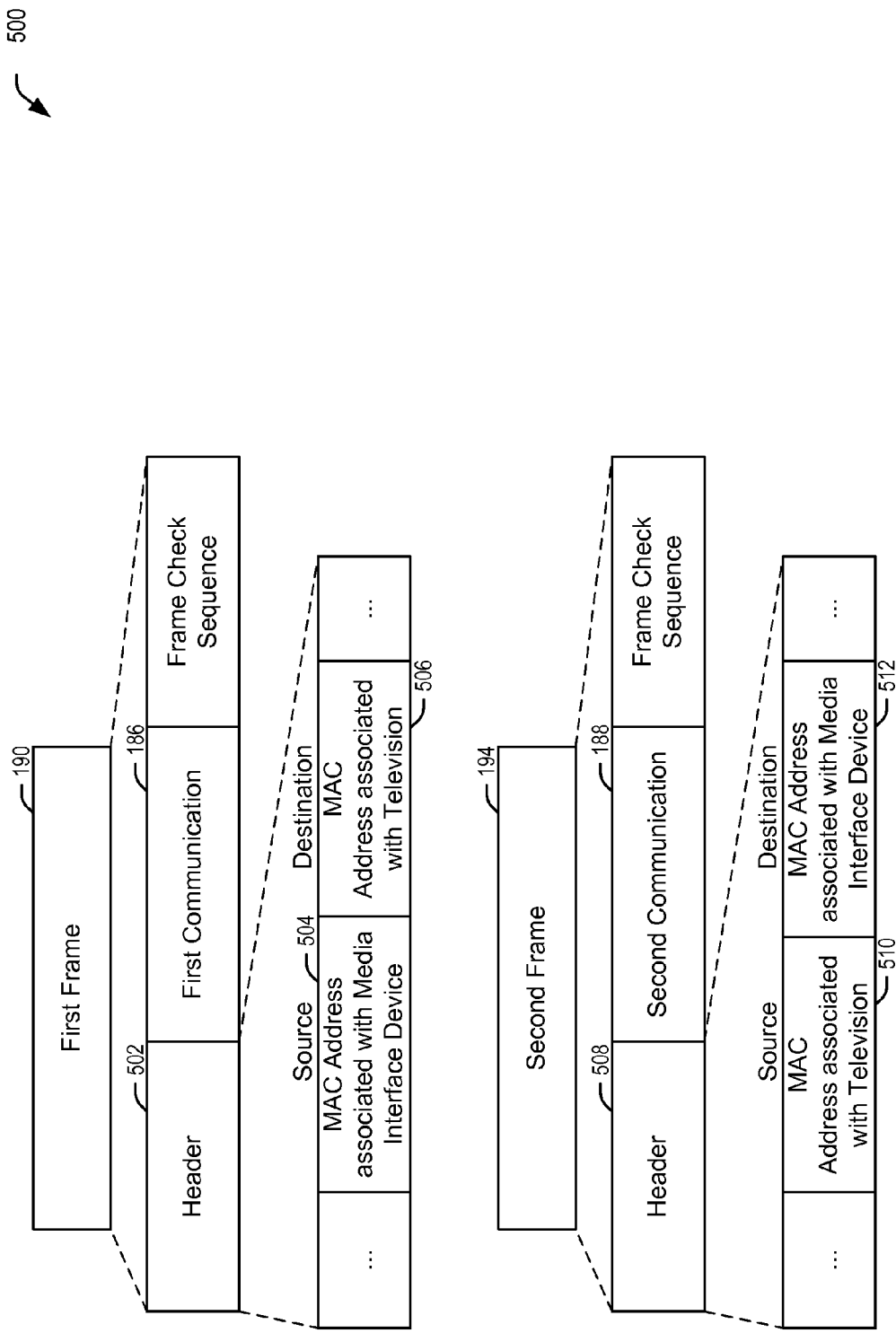
FIG. 5 is a diagram illustrating messages that may be sent to and received from a media interface device.

Referring to FIG. 5, a diagram 500 illustrating messages sent to and received from a media interface device is shown. The diagram 500 illustrates examples of the first frame 190 and the second frame 194 of FIG. 1. The first frame 190 and the second frame 194 may correspond to Ethernet frames, IEEE 802.11 frames, home phone networking alliance messages, power-line messages (e.g., Ethernet over power-line), or to another type of link layer frame.

The first frame 190 may include a header 502 in addition to the first communication 186. The header 502 may include a source field 504 and a destination field 506. The source field 504 may identify a MAC address associated with the media interface device 102 (e.g., a MAC address associated with the interface 182). The destination field 506 may identify a MAC address associated with the television 199 (e.g., a MAC address associated with a communications interface of the television 199).

The second frame 194 may include a header 508 in addition to the second communication 188. The header 508 may include a source field 510 and a destination field 512. The source field 510 may identify the MAC address associated with the television 199. The destination field 512 may identify the MAC address associated with the media interface device 102. In some examples, as shown in FIG. 5, the frames 190, 194 may include a frame check sequence (FCS) field. The FCS field may be used for error detection/correction.

Figure 6:
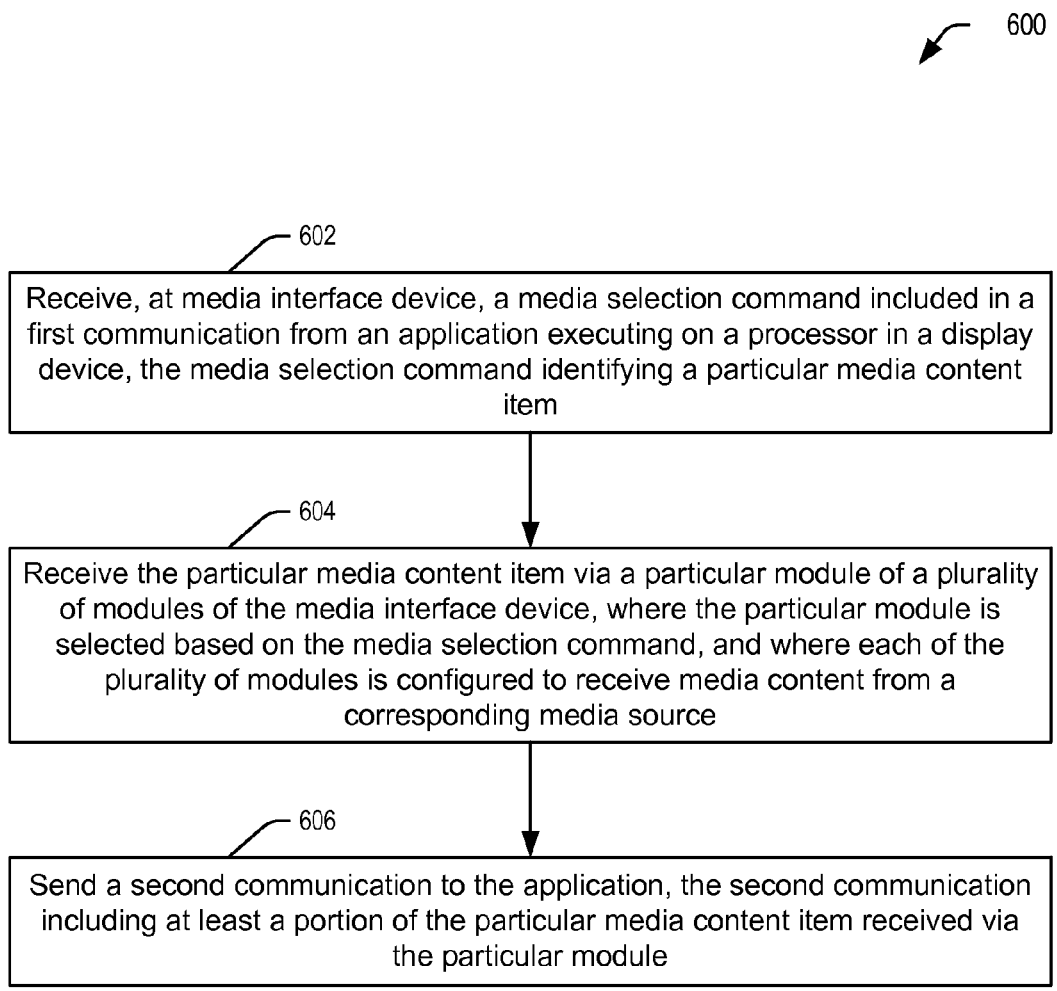
FIG. 6 is a flow diagram that illustrates a particular embodiment of a method for operating a media interface device.

Referring to FIG. 6 a flow diagram that illustrates a particular embodiment of a method 600 for operating a media interface device is shown. The method 600 may be performed by a media interface device, such as the media interface device 102. The method 600 includes receiving, at a media interface device, a media selection command included in a first communication from an application executing on a processor in a display device, at 602. The media selection command identifies a particular media content item. For example, referring to FIG. 1, the media interface device 102 may receive the first communication 186 including the media selection command 192 from the application 198 executing at a processor of the television 199. The media selection command 192 may identify a type of media content that is being requested (e.g., cable, satellite, IPTV, etc.), a particular television channel, a particular program being broadcast on the particular television channel, etc.

The method 600 further includes receiving the particular media content item (or at least a portion thereof) via a particular module of a plurality of modules of the media interface device, at 604. The particular module is selected based on the media selection command, and each of the plurality of modules is configured to receive media content from a corresponding media source. For example, referring to FIG. 1, the media interface device 102 includes the 8VSB module 106, the satellite DVB module 108, the IPTV module 110, and the CATV module 112. Each of the modules 106, 108, 110, 112 is configured to receive media content using a different communication technology (e.g., the antenna 118, the satellite antenna 120, the ILEC VDSL connection 122, and the digital cable multicast connection 124). When the media selection command 192 indicates that 8VSB content is requested, the control plane 104 may determine whether an 8VSB module is available to send the particular media content item 184 to the application 198 in response to the media selection command 192. In response to determining that the 8VSB module 106 is available, the control plane 104 may send the signal 105 to the 8VSB module 106 to cause the 8VSB module 106 to receive (e.g., acquire) the requested media content item 184.

The method 600 further includes sending a second communication to the application, the second communication including at least a portion of the particular media content item received via the particular module. For example, referring to FIG. 1, the 8VSB module 106 may, in response to the signal 105, send the second communication 188 to the interface 182 to be transmitted to the application 198. The second communication 188 includes the particular media content item 184 (or at least a portion thereof) received by the 8VSB module as part of the media content 183.

Figure 7:
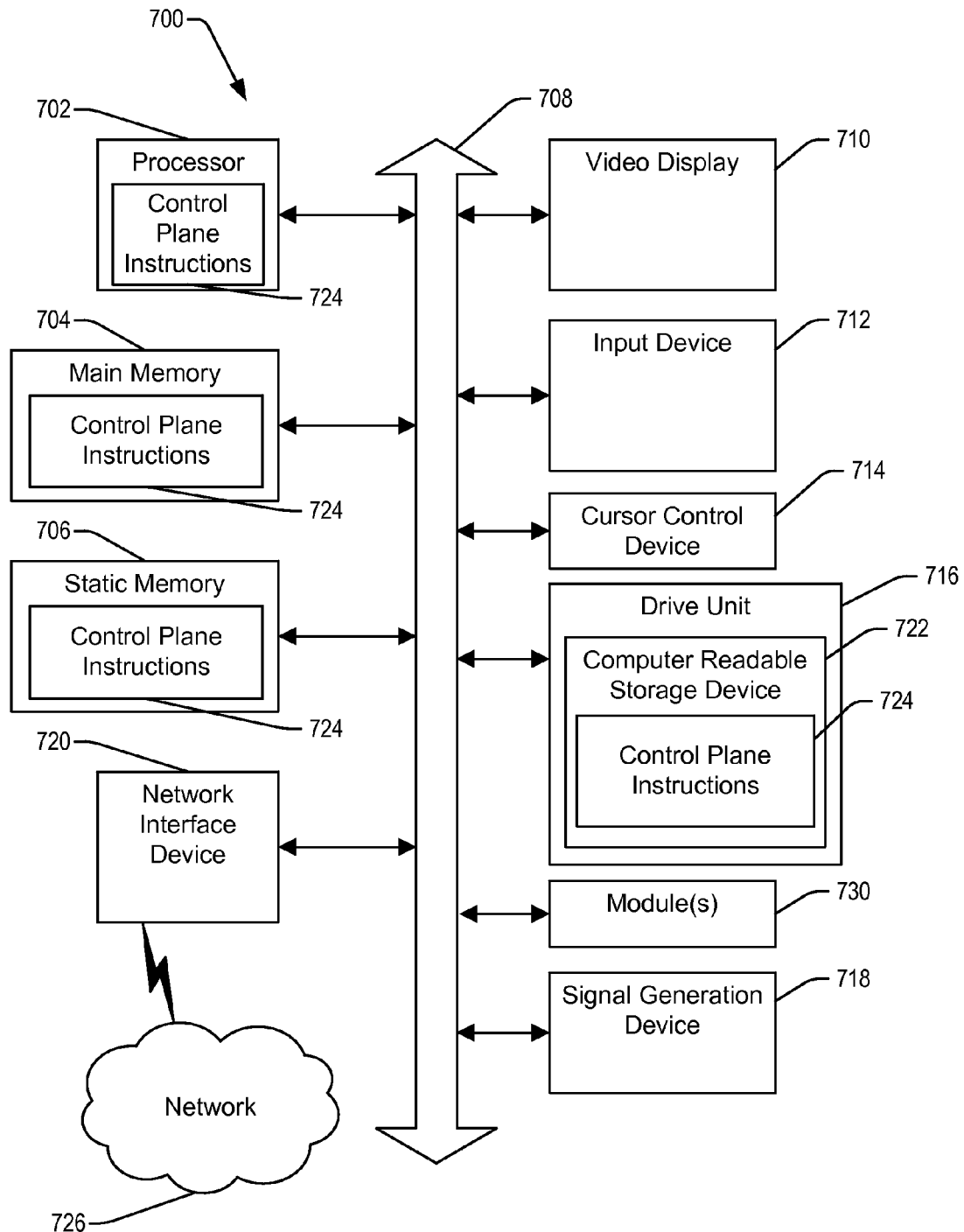
FIG. 7 is a block diagram of an illustrative embodiment of a general computer system.

Referring to FIG. 7, an illustrative embodiment of a general computer system is shown and is designated 700. The computer system 700 includes a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computer system 700 may include or be included within the media interface device 102 described with reference to FIGS. 1-5.

In a networked deployment, the computer system 700 may operate in the capacity of a server or as a client user computer in a server-client user network environment, or as a peer computer system in a peer-to-peer (or distributed) network environment. The computer system 700 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 700 may be implemented using electronic devices that provide video, audio, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 may include a main memory 704 and a static memory 706, which can communicate with each other via a bus 708. As shown, the computer system 700 may further include a video display unit 710, such as a liquid crystal display (LCD), a light emitting diode (LED) display, a touch screen display, a flat panel display, or a solid state display. Additionally, the computer system 700 may include an input device 712, such as a remote control device or a keyboard, and a cursor control device 714, such as a mouse. In some embodiments, the input device 712 and the cursor control device 714 may be integrated into a single device, such as a capacitive touch screen input device. The computer system 700 may also include a signal generation device 718, such as a speaker, and a network interface device 720. Some computer systems 700 may not include an input device (e.g., a server may not include an input device).

In a particular embodiment, as depicted in FIG. 7, the computer system 700 may include computer-readable storage 722 in which one or more sets of instructions 724, e.g. software, can be embedded. The computer-readable storage 722 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 724 may embody one or more of the methods or logic as described herein. The instructions 724 may be executable by the processor 702 to perform one or more functions or methods described herein, such as the method 600 described with reference to FIG. 6. In a particular embodiment, the instructions 724 may reside completely, or at least partially, within the main memory 704, the static memory 706, and/or within the processor 702 during execution by the computer system 700. The main memory 704 and the processor 702 also may include a computer-readable storage device.

FIG. 7 illustrates a particular embodiment in which the computer system 700 may correspond to a media interface device, and the device may include one or more modules 730. For example, the modules 730 may correspond to the modules 106, 108, 110, 112, 114, 116 of FIGS. 1-4.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 722 that stores instructions 724, so that a device connected to a network 728 may communicate voice, video or data over the network 728. While the computer-readable storage 722 is shown to be a single device, the computer-readable storage 722 may include a single device or multiple devices, such as a centralized or distributed database, and/or associated caches and servers that store one or more sets of instructions. The computer-readable storage 722 is capable of storing a set of instructions for execution by a processor to cause a computer system to perform any one or more of the methods or operations disclosed herein. For example, the computer-readable storage 722 may store instructions for execution by a processor to cause a computer system to perform the method 600 described with reference to FIG. 6.

In a particular non-limiting, exemplary embodiment, the computer-readable storage 722 may include a solid-state memory such as embedded memory (or a memory card or other package that houses one or more non-volatile read-only memories). Further, the computer-readable storage 722 may be a random access memory or other volatile re-writable memory. Additionally, the computer-readable storage 722 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 700 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, at a media interface device, a media selection command included in a first communication from an application executing on a processor in a display device, the media selection command identifying a particular media content item, wherein the first communication is included in a first Ethernet frame, and wherein the first Ethernet frame identifies a media access control address associated with the display device as a source of the first Ethernet frame;
   receiving first media content as a first packetized stream in a first format, wherein the first media content is received via a first module of a plurality of modules of the media interface device, and wherein each of the plurality of modules is configured to receive media content in a particular format from a corresponding media source;
   receiving second media content as a second packetized stream in a second format different than the first format, wherein the second media content is received via a second module of the plurality of modules;
   converting the second packetized stream to a converted packetized stream in the first format, wherein converting the second packetized stream comprises decoding a portion of the second media content to generate decoded media content, and wherein the converted packetized stream is based on the decoded media content;
   selecting a particular packetized stream to send to the application based on the media selection command, wherein the particular packetized stream is selected from a plurality of packetized streams in the first format, the plurality of packetized streams provided by the plurality of modules, and wherein the plurality of packetized streams includes the first packetized stream and the converted packetized stream; and
   sending the particular packetized stream to the application as a second communication, the second communication including at least a portion of the particular media content item, wherein the second communication is included in a second Ethernet frame, and wherein the second Ethernet frame identifies the media access control address associated with the display device as a destination of the second Ethernet frame.

2. The method of claim 1, wherein each of the plurality of modules is configured to receive media content items via a different communication technology.

3. The method of claim 2, wherein the different communication technologies include 8 vestigial sideband, cable television, internet protocol television, satellite digital video broadcasting, or a combination thereof.

4. The method of claim 1, wherein the plurality of modules includes an 8-level vestigial side band module.

5. The method of claim 1, wherein converting the second packetized stream to the converted packetized stream further comprises:
   prior to decoding the portion of the second media content, demodulating the second packetized stream to generate a demodulated packetized stream;

prior to decoding the portion of the second media content, tuning to a particular frequency of the demodulated packetized stream to acquire the second media content; and after decoding the portion of the second media content, packetizing a portion of the decoded media content into a packet in the first format, wherein the converted packetized stream includes the packet.

6. The method of claim 1, further comprising, when the media selection command specifies internet protocol television, sending a multicast join request from an internet protocol television module of the plurality of modules to an internet protocol television source.

7. The method of claim 1, wherein the plurality of modules includes a satellite digital video broadcasting module.

8. The method of claim 1, wherein the plurality of modules includes an internet protocol television module.

9. The method of claim 1, further comprising modifying the first packetized stream to change a destination of the first packetized stream from the media interface device to the display device responsive to the particular packetized stream being the first packetized stream.

10. The method of claim 1, further comprising receiving a third communication from a second application executing on a second processor in a second display device, the third communication including a second media selection command for a second particular media content item.

11. The method of claim 10, further comprising:
selecting a second particular packetized stream to send to the second application based on the second media selection command, wherein the second particular packetized stream is selected from the plurality of packetized streams; and
sending the second particular packetized stream to the second application as a fourth communication, the fourth communication including at least a portion of the second particular media content item, and wherein the fourth communication is sent via a fourth frame.

12. An apparatus comprising:
a plurality of modules, wherein each of the plurality of modules is configured to receive media content in a particular format from a corresponding media source, and wherein the plurality of modules include:
a first module configured to receive first media content as a first packetized stream in a first format; and
a second module configured to:
receive second media content as a second packetized stream in a second format different than the first format; and
convert the second packetized stream to a converted packetized stream in the first format, wherein converting the second packetized stream comprises decoding a portion of the second media content to generate decoded media content, and wherein the converted packetized stream is based on the decoded media content;
an interface configured to:
receive a media selection command included in a first communication from an application executing on a processor in a display device, the media selection command identifying a particular media content item, wherein the first communication is included in a first Ethernet frame, and wherein the first Ethernet frame identifies a media access control address associated with the display device as a source of the first Ethernet frame; and
send a particular packetized stream in the first format to the application as a second communication, the second communication including at least a portion of the particular media content item, wherein the particular packetized stream is selected from a plurality of packetized streams in the first format, the plurality of packetized streams provided by the plurality of modules, and wherein the plurality of packetized streams includes the first packetized stream and the converted packetized stream, wherein the second communication is included in a second Ethernet frame, and wherein the second Ethernet frame identifies the media access control address associated with the display device as a destination of the second Ethernet frame; and
a control plane configured to select a particular module of the plurality of modules to receive the particular media content item based on the media selection command.

13. The apparatus of claim 12, further comprising a storage device configured to store media content items received by the particular module.

14. The apparatus of claim 12, wherein the particular module is configured to packetize media content to generate packetized media content.

15. The apparatus of claim 12, wherein the plurality of modules includes an 8-level vestigial side band module, a satellite digital video broadcasting module, an internet protocol television module, a cable television module, a direct internet access module, or a combination thereof.

16. The apparatus of claim 12, wherein the interface comprises a power-line interface, a home phone network alliance interface, an Ethernet interface, an institute of electrical and electronics engineers 802.11 interface, or a combination thereof.

17. A computer readable storage device comprising instructions executable by a first processor to perform operations including:
receiving a media selection command included in a first communication from an application executing on a processor in a display device, the media selection command identifying a particular media content item, wherein the first communication is included in a first Ethernet frame, and wherein the first Ethernet frame identifies a media access control address associated with the display device as a source of the first Ethernet frame;
receiving first media content as a first packetized stream in a first format, wherein the first media content is received via a first module of a plurality of modules, and wherein each of the plurality of modules is configured to receive media content in a particular format from a corresponding media source;
receiving second media content as a second packetized stream in a second format different than the first format, wherein the second media content is received via a second module of the plurality of modules;
converting the second packetized stream to a converted packetized stream in the first format, wherein converting the second packetized stream comprises decoding a portion of the second media content to generate decoded media content, and wherein the converted packetized stream is based on the decoded media content;
selecting a particular packetized stream to send to the application based on the media selection command, wherein the particular packetized stream is selected from a plurality of packetized streams in the first format, the plurality of packetized streams provided by the plurality of modules, and wherein the plurality of packetized streams includes the first packetized stream and the converted packetized stream; and sending the particular packetized stream to the application as a second communication, the second communication including at least a portion of the particular media content item, wherein the second communication is included in a second Ethernet frame, and wherein the second Ethernet frame identifies the media access control address associated with the display device as a destination of the second Ethernet frame.

18. The computer readable storage device of claim 17, wherein each of the plurality of modules is configured to receive media content via a different communication technology.

19. The computer readable storage device of claim 18, wherein the plurality of modules includes a cable television module.

* * * * *